Patented Nov. 11, 1947

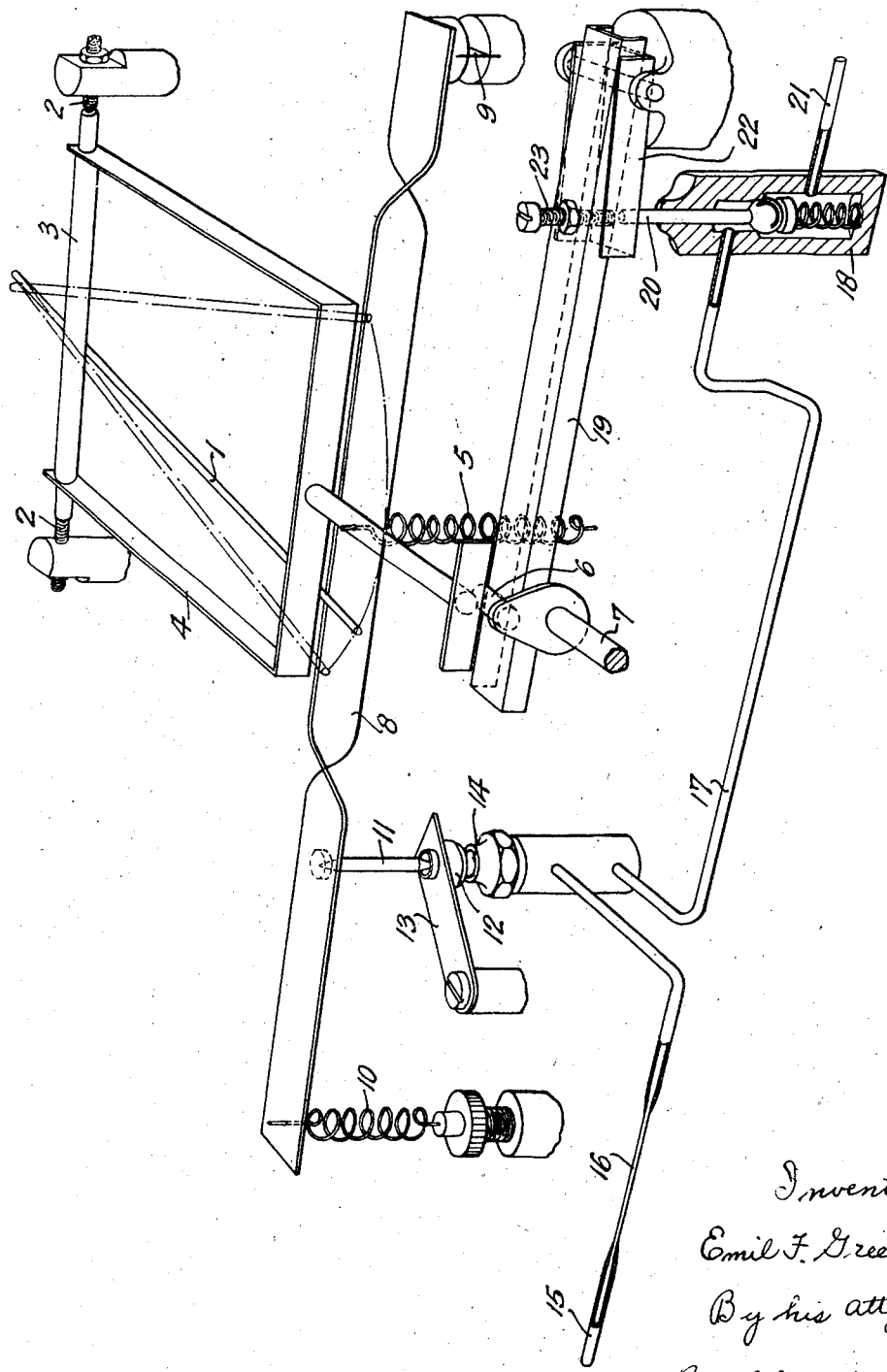

2,430,503

UNITED STATES PATENT OFFICE 2,430,503

INDICATING, RECORDING, OR CONTROL APPARATUS

Emil Frederick Greening, Ickenham, England, assignor to Negretti & Zambra, London, England Application October 2, 1944, Serial No. 556,871
In Great Britain October 1, 1943

8 Claims. (Cl. 137—139)

(Granted under the provisions of sec. 14, act of March 2, 1927; 357 O. G. 5)

This invention relates to indicating, recording or control apparatus, and it has for its primary object to furnish sensitive means for detecting and operating any response to small variations in a variable, and to provide an effective relay for operating apparatus requiring more power than is furnished by the primary device operated by the variable itself.

The variable concerned may be of many kinds, for example a physical variable such as temperature, pressure or humidity.

The response to the changes of the variable may be produced more or less directly in a mechanical form, or it may be translated through electrical means as, for example, by a thermocouple or resistance pyrometer. The invention requires only that the response, however it may be derived from the variable, shall eventually take the form of a displacement of a physical member, such as a pointer. Such member will hereinafter be referred to as a pointer, but it will be understood that this term is intended to cover any member which moves its position, whether by swinging or in any other manner, to an extent related to the value of the variable.

The indicating, recording or control apparatus according to the invention comprises means operating responsively to an applied force according to the point of application of that force, and means for applying the force at a point determined by the position, for the time being, of the pointer which is displaceable in accordance with changes of a variable.

The application of the force to the operating means may be transmitted directly through the pointer in such a manner as not to disturb the latter's position as determined by the value, for the time being, of the variable. Thus the force may be applied through the pointer in a direction at right angles to the plane of displacement of the pointer.

The preferred means for applying the force through the pointer comprises a device loaded with a predetermined force and capable of being brought into an operative position where it transmits its load through the pointer, and of being retracted to an inoperative position where the pointer is free to move in accordance with changes of the variable. Such a device may be analogous to mechanism generally known under the name "chopper bar" mechanism which has hitherto been employed for clamping a pointer, although it will be understood that such mechanism requires to be adapted for use according to the present invention so that it is loaded with and transmits uniformly a predetermined load.

The force transmitted through the pointer may be applied to a lever, at a point determined of course according to the position of the pointer, by which the force is brought into counterbalancing relationship with a reaction force which is self-adjusting to produce equilibrium and whose pressure determines and is used to provide the required indication, record or control.

This reaction force is preferably the fluid pressure at an escape nozzle in a fluid pressure line, the fluid pressure in that line being used directly, or indirectly through a relay to effect the required movement of indication, record or control. The fluid pressure arrangements of this kind are known wherein there is interposed in the line a constriction followed by a small escape nozzle against which operates a pallet which with a very small movement controls the escape of fluid through the nozzle and causes pressure behind the nozzle to build up or subside to a value dependent on the position of the pallet and equal to the force acting on the other side of the pallet.

A device of this kind is advantageously used in the apparatus of the present invention, the force on the other side of the pallet being applied through the lever hereinbefore mentioned.

One form of the apparatus according to the invention is shown isometrically in the accompanying drawing.

Referring to the drawing, 1 is a pointer which is to be assumed to be connected to a primary device operated by a physical variable through electrical or other means and constrained to move in a plane, as indicated by the dotted line, as in ordinary indicating instruments. Above the pointer is pivoted at 2, about an axis 3 parallel to the plane of displacement of the pointer, a chopper bar 4 loaded by a tension spring 5 with a predetermined load. The chopper bar 4 is adapted to be lifted against the action of its loading spring 5, to a position clear of the pointer, and of being released at will to come down upon the pointer under the action of its loading spring. This is effected by an eccentric 6 mounted on a rotating shaft 7 so that when the latter is rotated the chopper bar is alternately raised and lowered.

Underneath the pointer and parallel with the chopper bar is mounted a beam or lever 8 fulcrumed at one end at 9 and at the other end acted upon by an adjustable spring 10 serving as a zero adjustment. At an intermediate point the lever bears through a strut 11 upon a pallet 12 carried by a springy flexible arm 13 adjacent to a small escape nozzle 14 in an air supply line 15 which is provided with a constriction 16 at a suitable point behind the nozzle so that equilibrium is produced between the air pressure in the nozzle system and the pallet loading.

Pressure from the nozzle 14 is led away in a pipe 17 to a valve 18 of a simple spring and ball type actuated by a lever 19 through a push rod 20. By movement of the valve lever 19 the valve is opened when it is desired to transmit the pressure in the air pipe 17, by means of pipe 21, to the pressure element of a controller, recorder or indicator, or to a pressure relay operating another device such as a power cylinder or diaphragm motor.

The movement of the valve actuating lever 19 is synchronised with the movement of the chopper bar 4 so that when the latter is released to bear down upon the pointer 1 and transmit its load to the balancing lever 8, the valve lever 19 simultaneously operates to open the valve 18 and transmit the air pressure, at its value for the time being, to the controller, and/or recorder and/or indicator, or relay. The same eccentric 6 used for raising and lowering the chopper bar 4 accordingly operates on the valve actuating lever 19. The latter is provided with an adjustment, consisting of an auxiliary lever 22 and adjustable screw 23, to regulate the timing and valve opening, it being understood that a certain interval of time is required for the pressure within the nozzle 14 to build up or subside to the pressure required to balance the force imposed on the pallet 12 from the balancing lever 8.

The shaft 7 of the eccentric 6 may be continuously rotated so that the cycle of events is repeated automatically and a series of intermittent responses of the mechanism is continually transmitted.

It will be appreciated that the operating fluid pressure transmitted from the apparatus is in linear relationship with the movement of the pointer.

What I claim is:

1. Indicating, recording or control apparatus comprising a member displaceable in accordance with changes of a variable, a device on one side of said member loaded with a constant force, a load balance on the opposite side of said member adapted to react according to the point whereat a load is applied thereto, means for measuring said reaction, and means for bringing said device into and out of an operative position wherein it transmits its load through said member to said load balance.

2. Indicating, recording or control apparatus comprising a member displaceable in accordance with changes of a variable, a device on one side of said member loaded with a constant force, a load-balance on the opposite side of said member adapted to react according to the point whereat a load is applied thereto, means for measuring said reaction and means for bringing said device into and out of an operative position wherein it transmits its load through said member, to said load-balance at right angles to the direction of displacement of said member.

3. Indicating, recording or control apparatus comprising a member displaceable in accordance with changes of a variable, a device on one side of said member loaded with a predetermined force, a pivoted lever positioned on the other side of said member so that the latter when displaced moves longitudinally with respect to said lever, means for bringing said device into an operative position wherein it transmits its load through said member to said lever, and self-adjusting means applying a reaction force counterbalancing the force applied through said member.

4. Indicating, recording or control apparatus comprising a member displaceable in accordance with changes of a variable, a device on one side of said member loaded with a predetermined force, a pivoted lever positioned on the other side of said member so that the latter when displaced moves longitudinally with respect to said lever, means for bringing said device into an operative position wherein it transmits its load through said member to said lever, and an escape nozzle in a fluid pressure line and arranged so as to apply to said lever a force counterbalancing the force applied through said member.

5. Apparatus as claimed in claim 1 in which the means for bringing said device into and out of operative position has an automatic intermittent action.

6. Apparatus as claimed in claim 1 comprising a continuously rotating shaft, and an eccentric carried by said shaft and operating on said device to bring it intermittently into and out of the operative position.

7. Apparatus as claimd in claim 4 in which the fluid pressure line is connected on one side of said nozzle to a fluid pressure supply and on the other side to a valve provided with means whereby it is intermittently opened.

8. Apparatus as claimed in claim 1 in which the means for bringing said device into and out of operative position has an automatic intermittent action, the same means functioning to bring the said device intermittently into operative position.

EMIL FREDERICK GREENING.

REFERENCES CITED

The following references are of record in the file of this patent:

UNITED STATES PATENTS

| Number | Name | Date |
|---|---|---|
| 893,176 | Levilly | July 14, 1908 |
| 1,721,800 | Wunsch | July 23, 1929 |
| 1,798,932 | Dreiske | Mar. 31, 1931 |
| 1,953,406 | Hodgson | Apr. 3, 1934 |
| 2,132,338 | Ziebolz | Oct. 4, 1938 |
| 2,211,317 | Brown | Aug. 13, 1940 |
| 2,244,564 | Mason | June 3, 1941 |